(12) United States Patent
Chiang (10) Patent No.: US 8,056,598 B2
(45) Date of Patent: Nov. 15, 2011

(54) AIR CUSHION MAKER

(76) Inventor: Tung-Lung Chiang, Taichung (TW)

( * ) Notice: Subject to any disclaimer, the term of this patent is extended or adjusted under 35 U.S.C. 154(b) by 336 days.

(21) Appl. No.: 12/462,323

(22) Filed: Jul. 31, 2009

(65) Prior Publication Data
US 2011/0024055 A1 Feb. 3, 2011

(51) Int. Cl.
*B32B 37/00* (2006.01)
(52) U.S. Cl. ..... 156/497; 156/555; 156/582; 156/583.1; 53/79; 53/403
(58) Field of Classification Search ................ 156/497, 156/555, 580, 582, 583.1; 53/79, 403
See application file for complete search history.

(56) References Cited

U.S. PATENT DOCUMENTS

| | | | | |
|---|---|---|---|---|
| 5,552,003 A | * | 9/1996 | Hoover et al. | 156/147 |
| 6,195,966 B1 | * | 3/2001 | Shomron et al. | 53/451 |
| 6,519,916 B1 | * | 2/2003 | Brown | 53/403 |
| 7,146,778 B2 | * | 12/2006 | Loibl | 53/79 |
| 2007/0251190 A1 | * | 11/2007 | Daigle et al. | 53/403 |

* cited by examiner

*Primary Examiner* — James Sells
(74) *Attorney, Agent, or Firm* — Charles E. Baxley (57) ABSTRACT

An air cushion maker includes a pair of forming rollers that are provided with recesses and electrothermal wires so that two consecutive plastic films passing between the forming rollers are made into air cushions with geometric puffy air cells.

8 Claims, 10 Drawing Sheets

AIR CUSHION MAKER

BACKGROUND OF THE INVENTION

1. Technical Field

The present invention relates to machines that make buffer materials for packing purposes, and more particularly, to an air cushion maker that features for simultaneous inflating, sealing and air cell forming.

2. Description of Related Art

Figure 1:
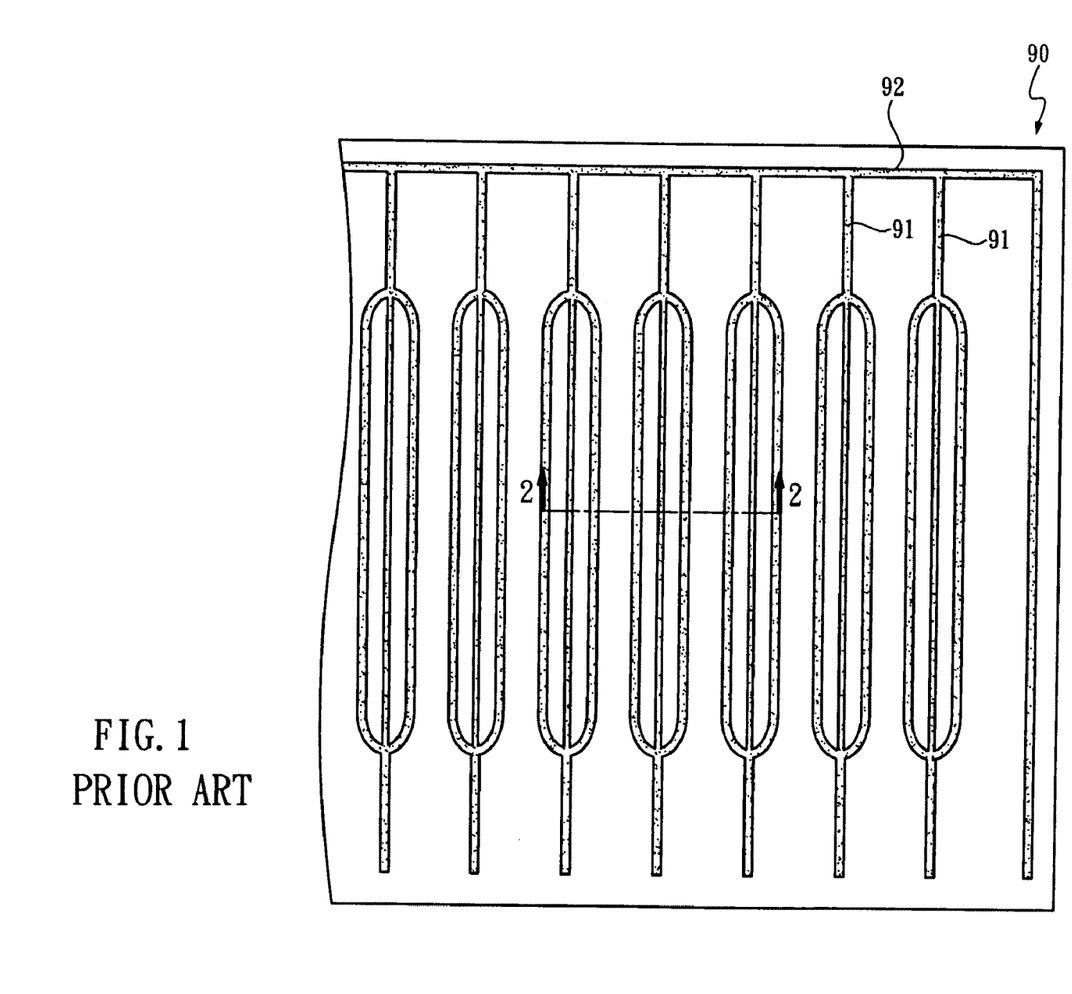
FIG. 1 is a top view of a part of a conventional air cushion.
Figure 2:
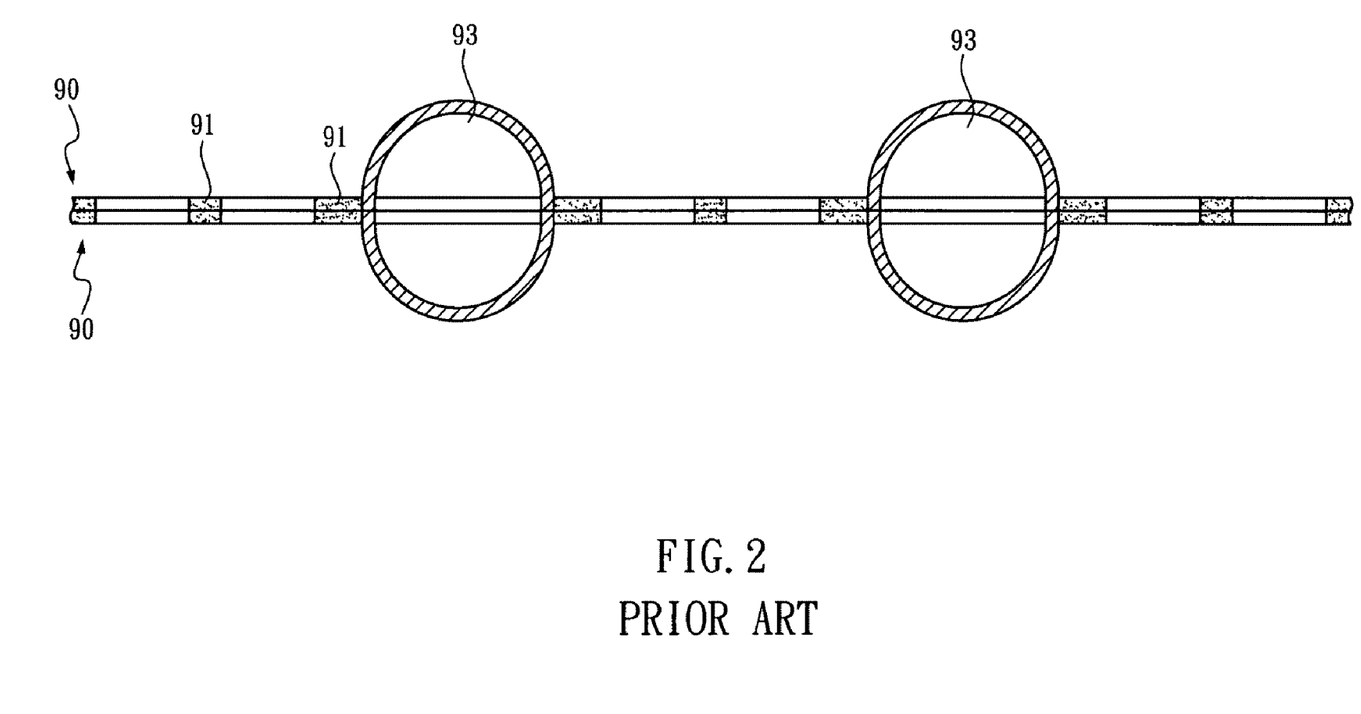
FIG. 2 is a sectional view of the conventional air cushion taken along Line 2-2 of FIG. 1.

A conventional process for making air cushions can be referred to FIGS. 1 and 2. In making the air cushion, two pieces of plastic film 90 are processed by a hot press to have a plurality of transverse sealing lines 91 distributed on the film and a sealing line 92 at a lengthwise side of the film, while an opposite lengthwise side is left open.

Then the film with the preformed sealing lines are rolled up as a film roll to be mounted on a feeding rack of an air cushion maker. A blower and a heat-sealing device are provided besides the air cushion maker. Then a material-feeding device draws the preprocessed film out from the film roll. The blower inflates the plastic film from the open side and the heat-sealing device immediately seals the open side so that air is retained between each two adjacent transverse sealing lines 91 and inflated air cells 93 are thus formed.

Figure 8:
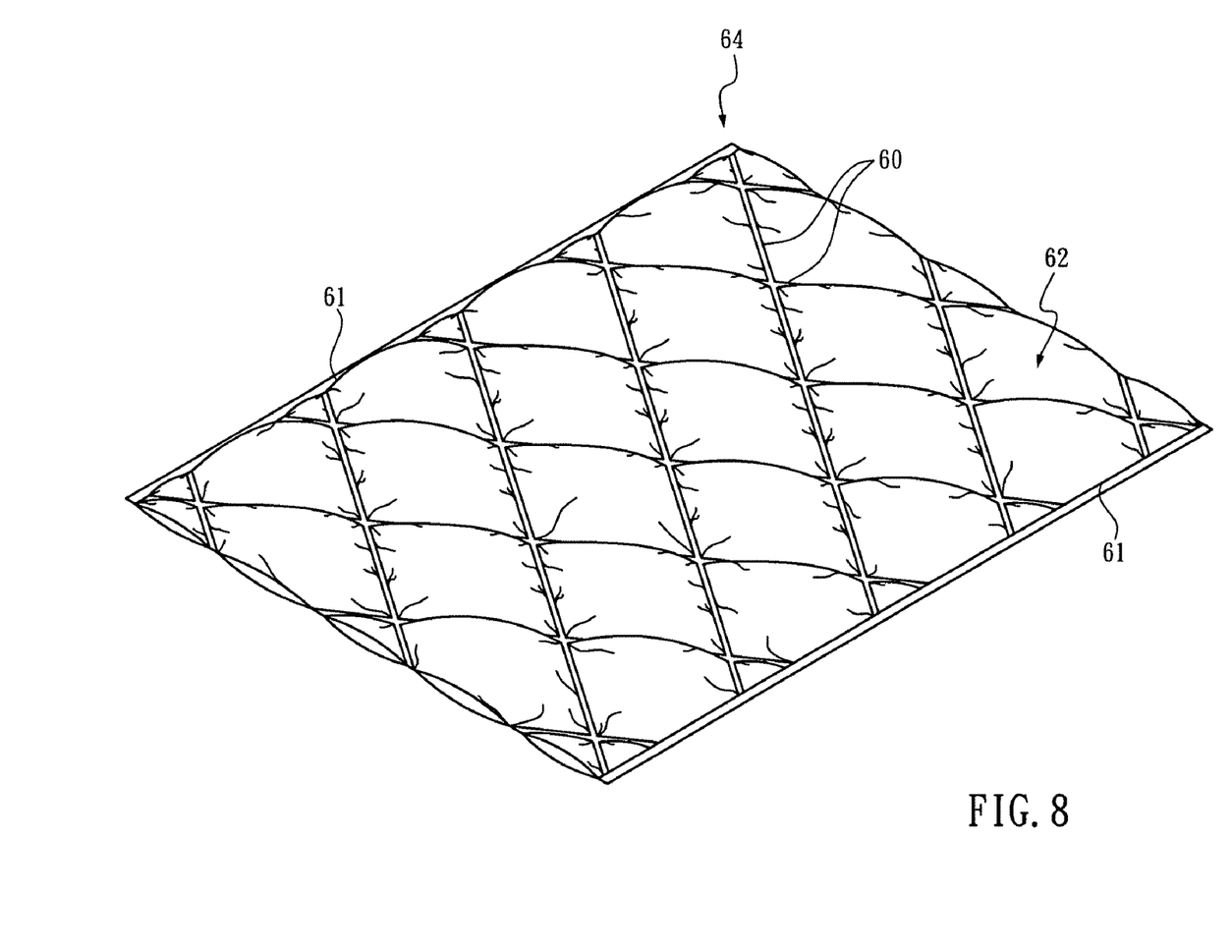
FIG. 8 shows an exemplary air cushion made by the air cushion maker of the present invention.

In the conventional process, making the transverse sealing lines 91 and inflating the pressed film are separately performed as two successive procedures by using different machines. Consequently, the production cycle is prolonged and only transversely extending cells are producible. In other words, it is impossible for the conventional process to produce rhomboidal air cells as shown in FIG. 8.

SUMMARY OF THE INVENTION

In view of the shortcomings of the conventional method of making air cushions, one objective of the present invention is to provide an air cushion maker, wherein the air cushion maker solely performs inflating, sealing and air-cell forming so as to shorten the production cycle and produce air cushions with different geometric air-cell shapes.

The air cushion maker of the present invention comprises a machine base, two material-feeding rollers assembled to the machine base and aligned with each other vertically, two forming rollers provided with recesses and electrothermal wires, and a blower. In operation, two film rolls installed onto the material-feeding rollers each provide a consecutive plastic film extending toward an output end of the machine base, and the blower provides a pressured air current between the films before the films pass the forming rollers so that when the films pass between the forming rollers, the two consecutive plastic films passing between the forming rollers are made into air cushions with geometric puffy air cells.

BRIEF DESCRIPTION OF THE DRAWINGS

The invention as well as a preferred mode of use, further objectives and advantages thereof will be best understood by reference to the following detailed description of an illustrative embodiment when read in conjunction with the accompanying drawing, wherein.

DETAILED DESCRIPTION OF THE PREFERRED EMBODIMENT

While a preferred embodiment provided hereinafter for illustrating the concept of the present invention as described above, it is to be understood that the components of the embodiment shown in the accompanying drawings are depicted for the sake of easy explanation and need not to be made in scale.

Figure 3:
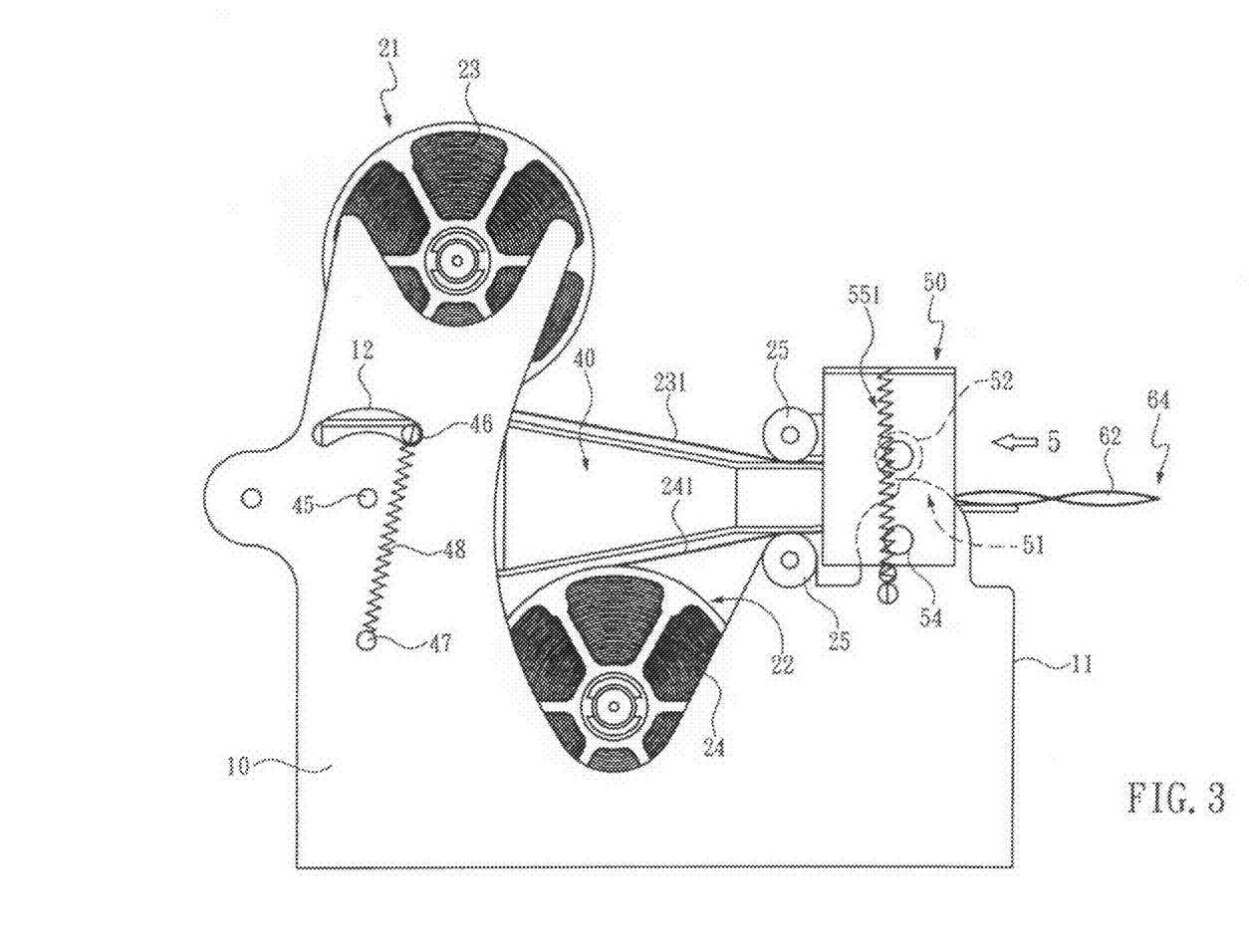
FIG. 3 is a side schematic drawing of an air cushion maker according to the present invention.
Figure 4:
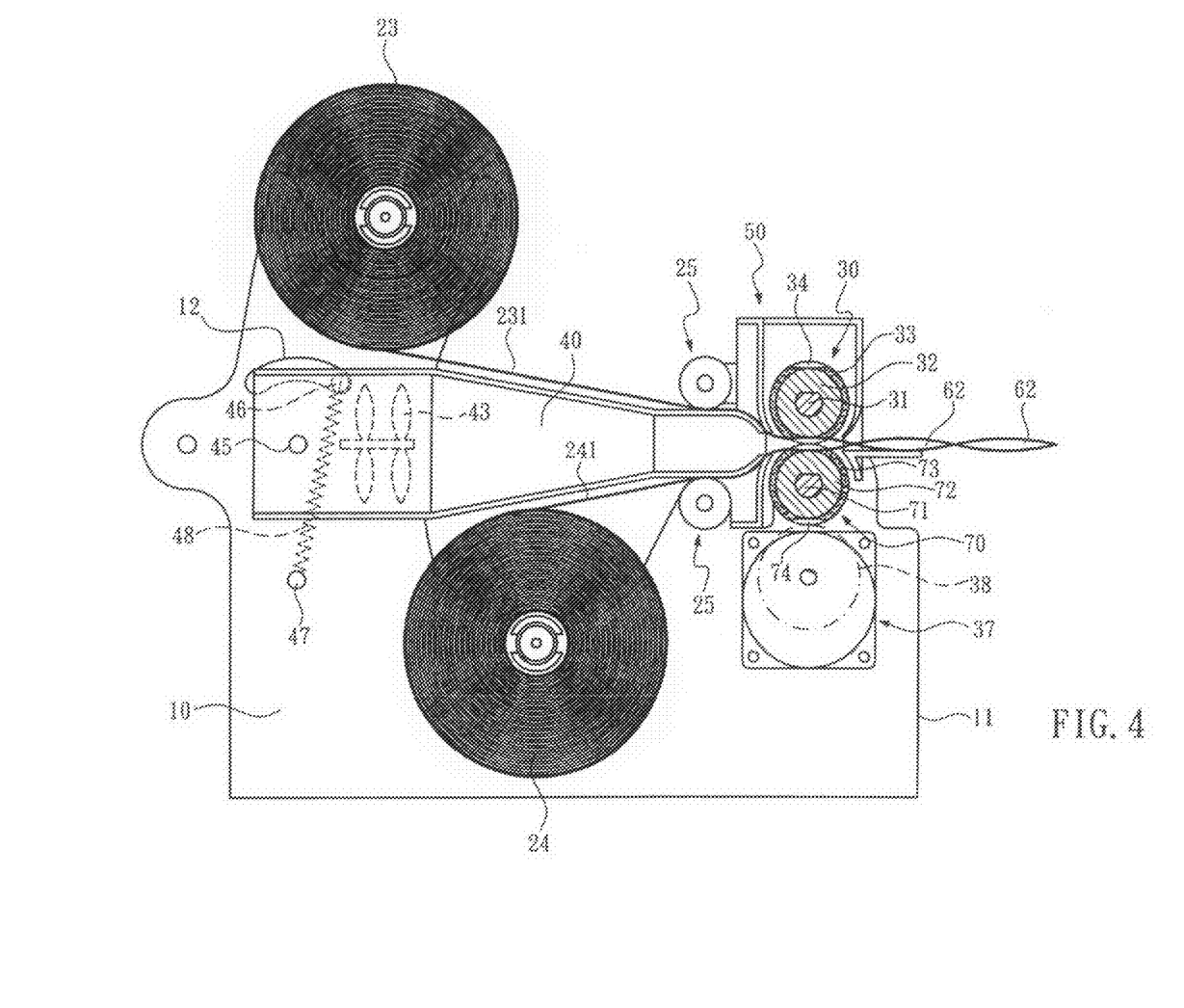
FIG. 4 is a sectional schematic drawing of the air cushion maker according to the present invention.
Figure 5:
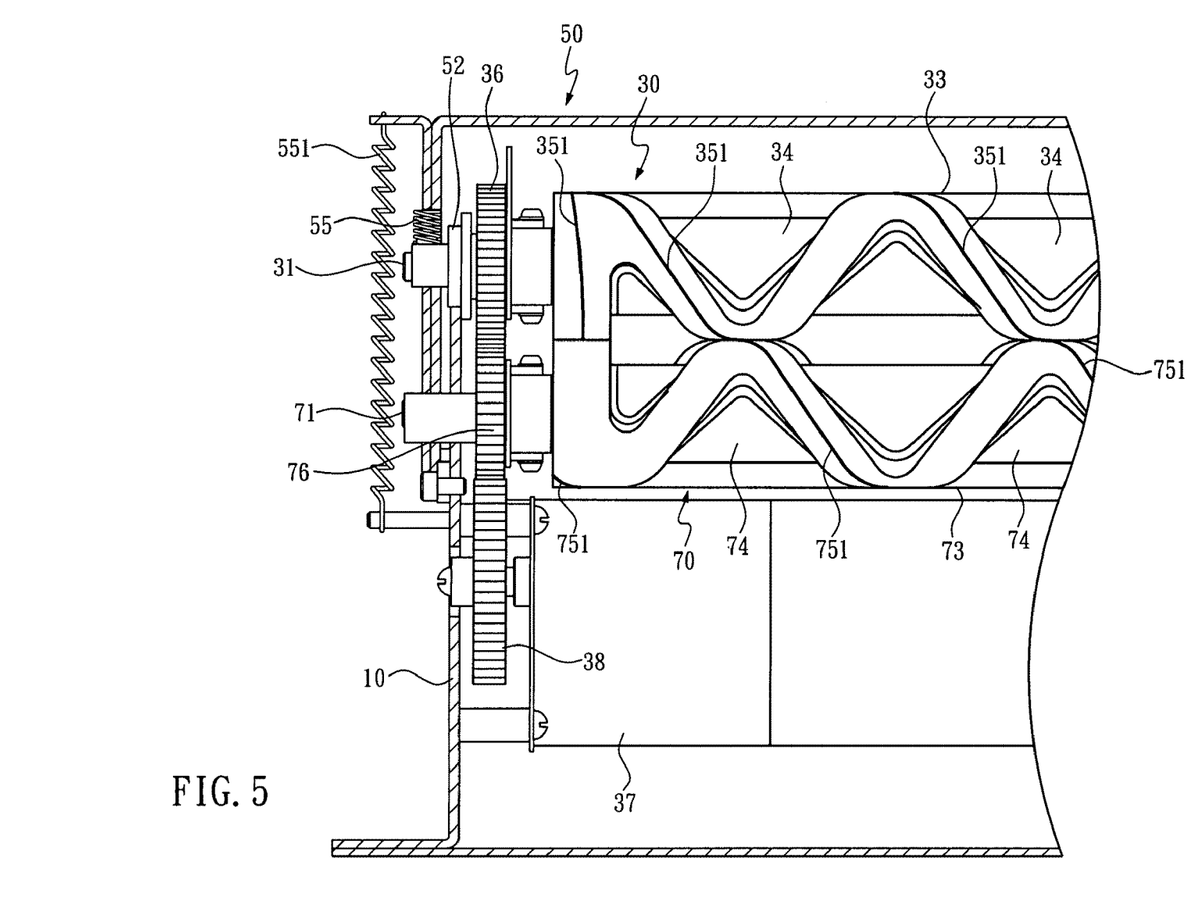
FIG. 5 is a partial plan of the air cushion maker from the viewpoint indicated by Arrow 5 of FIG. 3.

Please refer to FIGS. 3 through 5, an air cushion maker of the present invention includes a machine base 10, a pair of material-feeding rollers 21, 22, a pair of forming rollers 30, 70, and a blower 40.

The material-feeding rollers include a first material-feeding roller 21 and a second material-feeding roller 22 that are such assembled to the machine base 10 that an altitudinal difference exists therebetween. The first material-feeding roller 21 is configured for holding a first film roll 23 while the second material-feeding roller 22 is configured for holding a second film roll 24. Each of the first film roll 23 and the second film roll 24 provides a consecutive plastic film 231 or 241 extending toward an output end of the machine base 11. Two idle gears 25 are provided on the machine base 10 for tensioning the films 231, 241.

Figure 10:
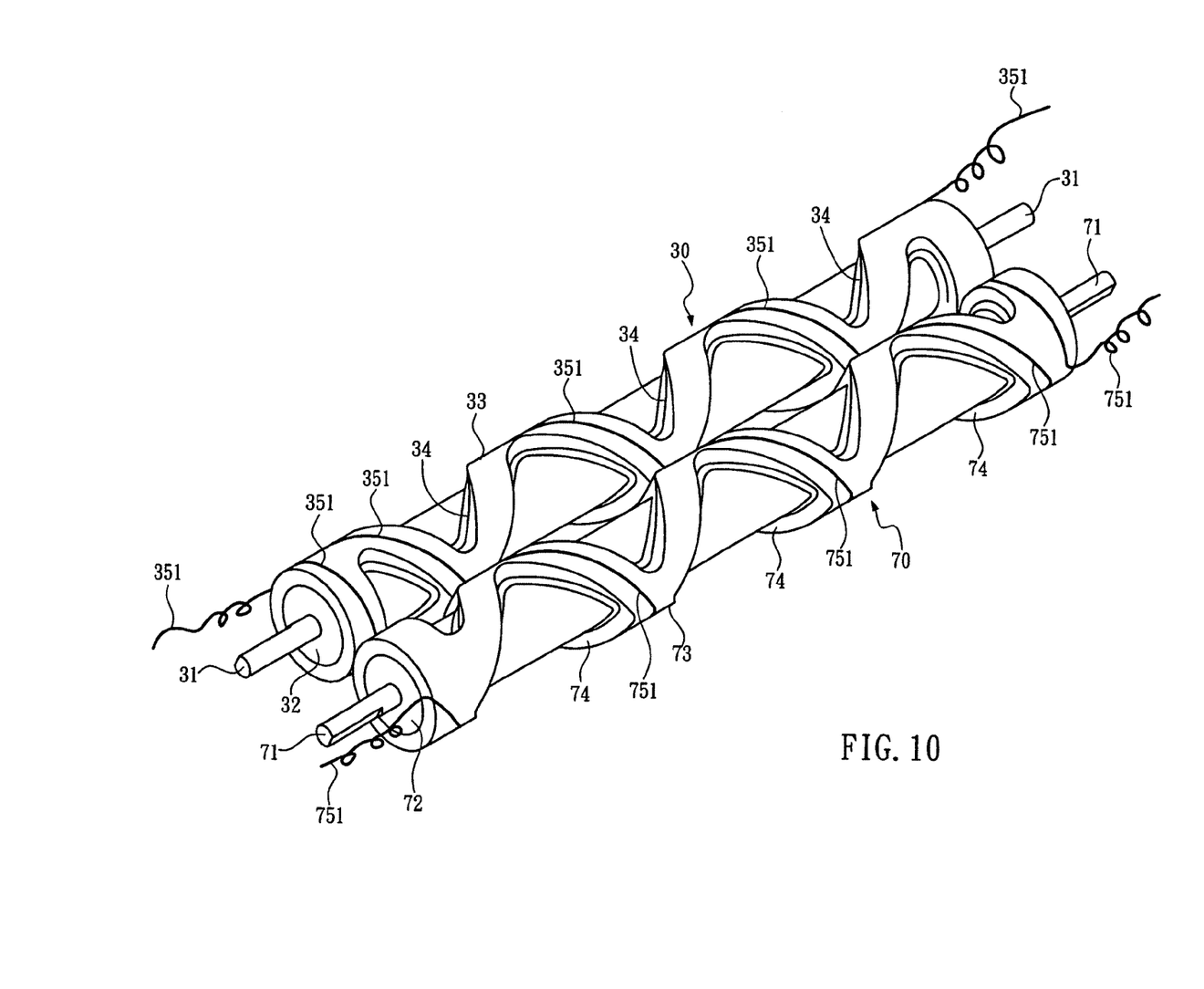
FIG. 10 is a perspective view of forming rollers of the air cushion maker of the present invention.

Referring to FIG. 10, the first forming roller 30 and the second forming roller 70 have their respective shafts 31, 71 mounted with liners 32, 72. Around the liners 32, 72, mold wheels 33, 73 are detachably mounted. Each of the mold wheels 33, 73 is externally provided with plural recesses 34 or 74 of predetermined shape and depth, and plural electrothermal wires 351 or 751. The electrothermal wires 351, 751 extend between the recesses 34, 74 along a predetermined direction and reach one ends of the mold wheels 33, 73 to form a loop. The electrothermal wires 351, 751 are coated with an insulation layer.

The second forming roller 70 has its shaft 71 mounted near the output end 11 of the machine base 10 while the first forming roller 30 has its shaft 31 mounted on a rack 50.

The rack 50 is attached to the machine base 10 near the output end 11 of the machine base 10. In operation, the first and second forming rollers 30, 70 vertically aligned and the two mold wheels 33, 73 contact mutually. Two gears 36, 76 are mounted around the two shafts 31, 71, respectively, and engage with each other. A driving gear 38 driven by a driving device 37 engages with the gear 76 so that rotation of the gear 76 makes the shafts 31, 71 to rotate in reverse directions, and thus delivers the plastic films 231, 241 toward the output end 11 of the machine base 10. There is a spring 55 arranged between the rack 50 and the machine base 10 to ensure close contact between the two mold wheels 33, 73.

The blower 40 is settled in the machine base 10, between the first material-feeding roller 21 and the second material-feeding roller 22, and behind the first and second forming rollers 30, 70. The blower 40 includes therein at least one motor fan 43, and has an air outlet 44 corresponding to the border of the first and second forming rollers 30, 70.

Please refer to FIG. 4 for illustration of the operation of the air cushion maker. Therein, the plastic films 231, 241 are stacked and passing between the two mold wheels 33, 73. The blower 40 continuously releases pressured air current from the air outlet 44. At this times, since the air outlet is adjacent to the border between the two mold wheels 33, 73, the two plastic films 231, 241 at the critical point of lamination between the two mold wheels 33, 73, include the pressured air current therein. The pressure air pushes the plastic films 231, 241 to closely abut against the mold wheels 33, 37 on surfaces of the recesses 34, 74. Then, once the films 231, 241 pass between the mold wheels 33, 37, the electrothermal wires 351, 751 make plural interlaced sealing lines 60 and two sidelines 61 on the stacked plastic films 231, 241, so that puffy air cells are formed between the films 231, 241, as shown in FIG. 8. Since the mold wheels 33, 37 are detachably assembled to the liners 32, 72, the air cushion maker is enabled to make air cushions with differently shaped air cells by using the mold wheels 33, 37 having different configurations of recesses 34, 74 and electrothermal wires 351, 751.

Figure 6:
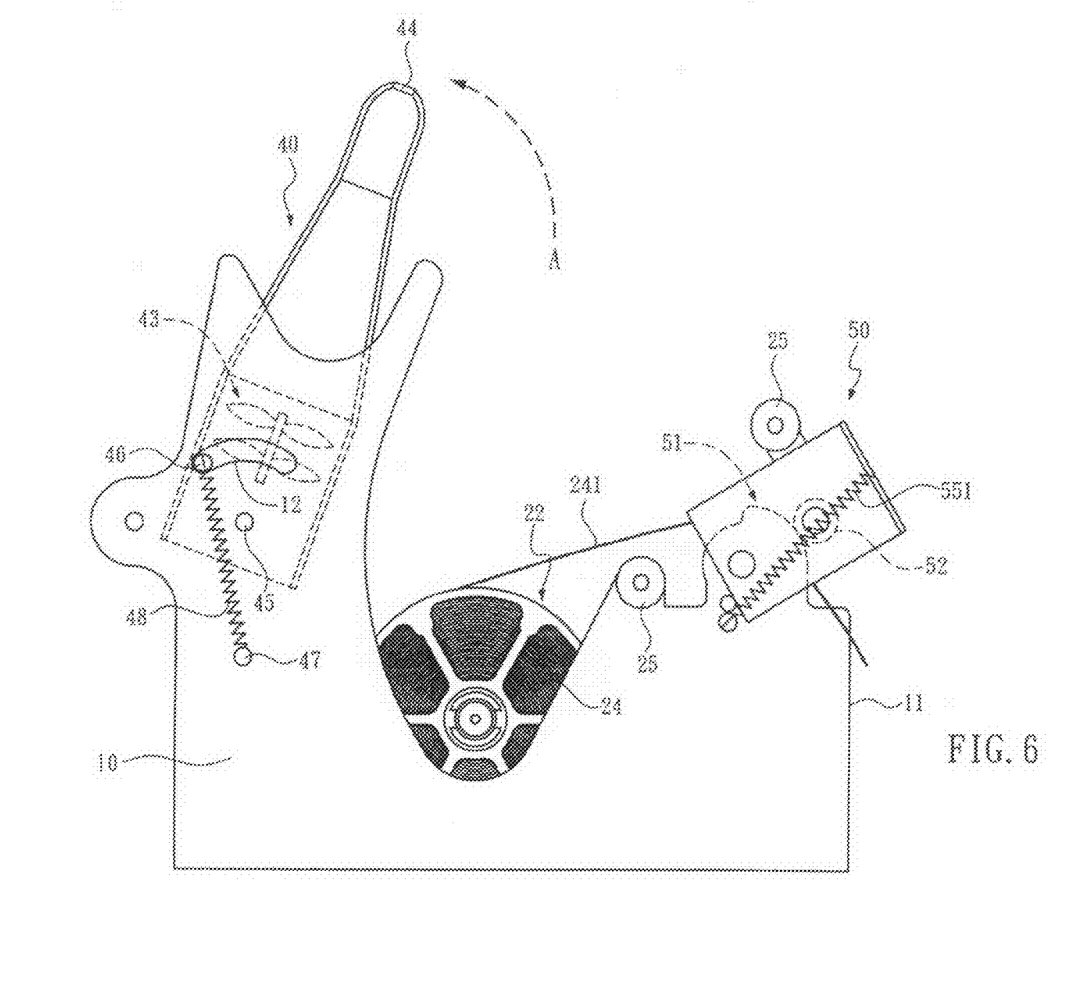
FIG. 6 is a schematic drawing of the air cushion maker showing a second film roll installed.
Figure 7:
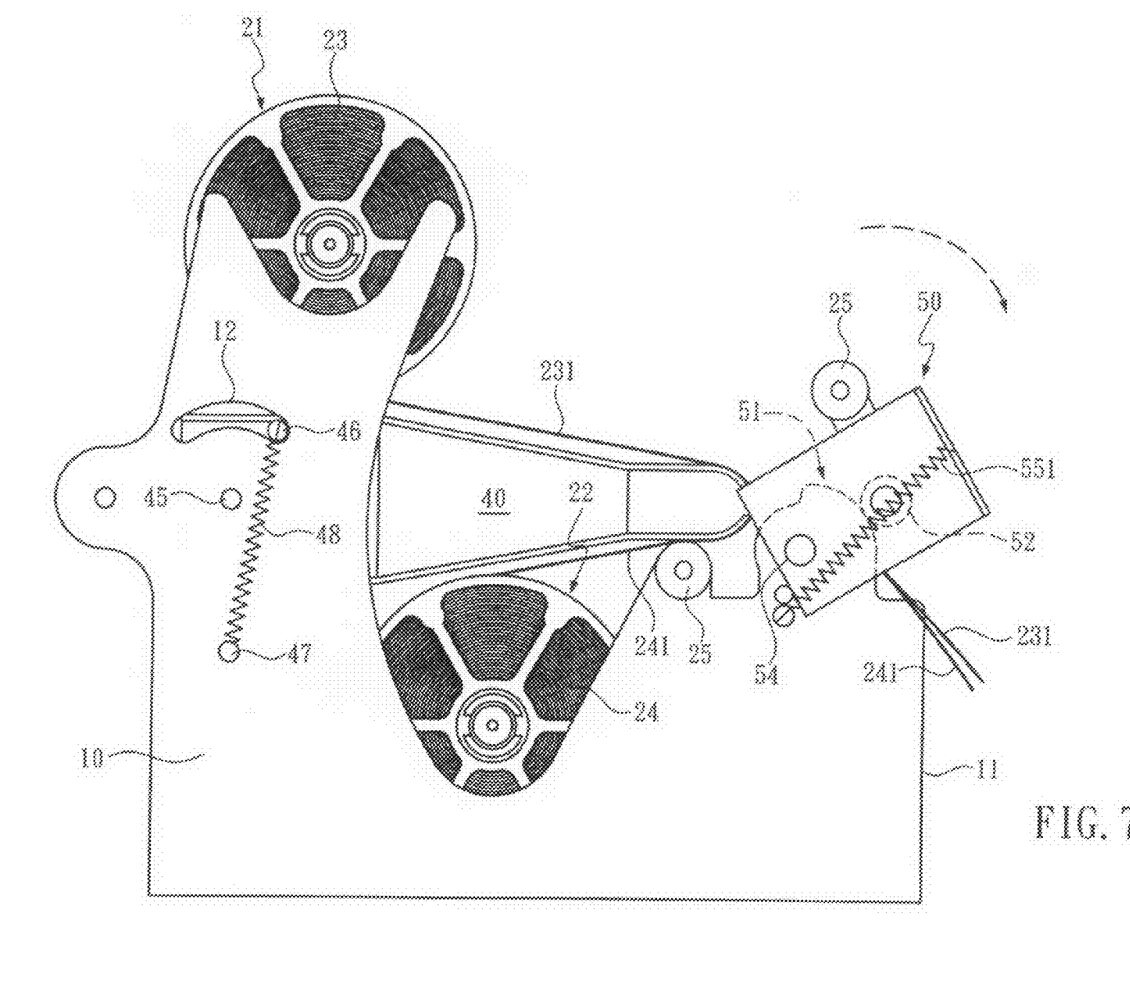
FIG. 7 is a schematic drawing of the air cushion maker showing a first film roll installed.

FIGS. 5 through 7 describe loading and unloading the first and second film rolls 23, 24. The rack 50 has a slot (not shown) and vertically floating bearing for receiving ends of the shaft 31 of the first forming roller 30. The rack 50 is pivotally connected to the shaft 71 of the second forming roller 70. Rails 51 and pulleys 52 may be provided flanking the rack 50 and the machine base 10. The pulleys 52 are mounted around the shaft 31 of the first forming roller 30. The rails 52 define a cam track that includes a curved segment downward to the output end 11 of the machine base 10 so that the pulleys 52 are allowed to slide along the cam track. Thereby, the rack 50 can be pulled toward the output end 11 of the machine base 10 (as shown in FIG. 6). Then, after the first film roll 23 is removed, the blower 40 can be lifted (as shown in FIG. 6) against its end pivotally connected with the machine base through a pivot assembly 45.

Figure 9:
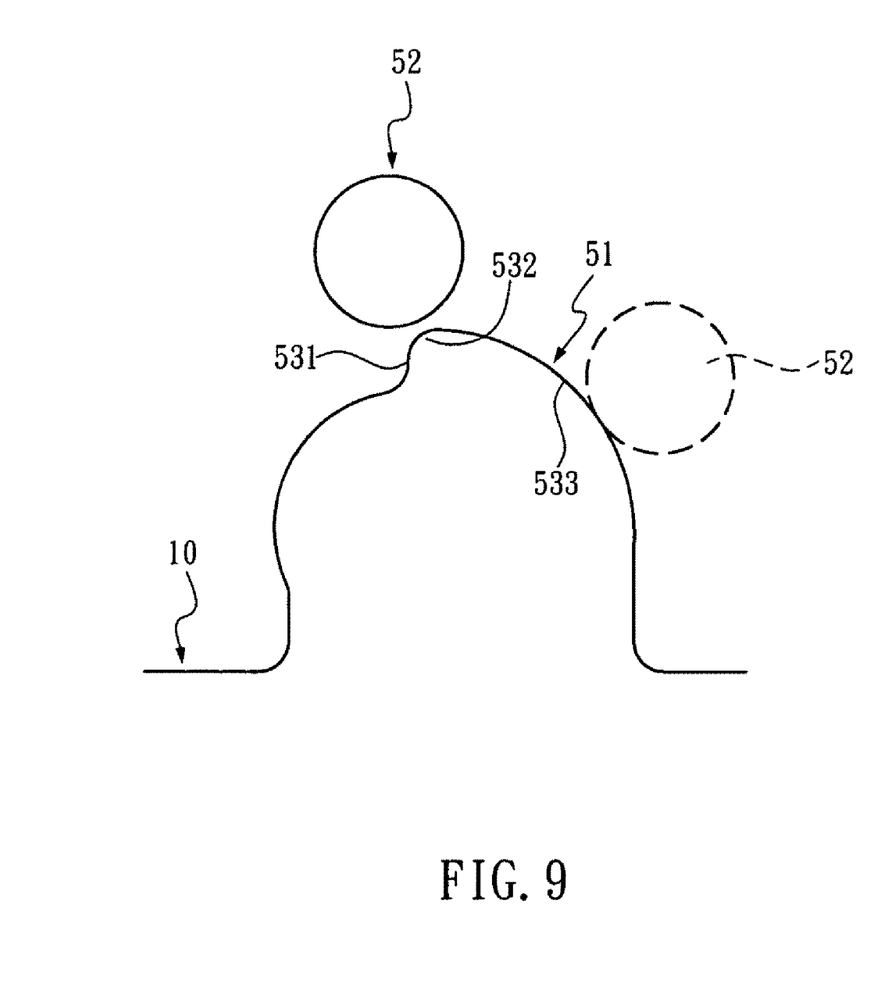
FIG. 9 is a schematic drawing illustrating rails and pulleys of the air cushion maker of the present invention.

Referring to FIGS. 3, 4 and 9, in the present embodiment, the cam track is defined along top edges of lateral walls of the machine base 10. The cam track includes an climbing segment 531 raising from the top edges of lateral walls of the machine base 10, a chamfer segment 532 following the up-going segment 531, and a declining segment 533 following the chamfer segment 532. Under the operational status of FIG. 3, the pulleys 52 are positioned at the borders between the chamfer segment 532 and the climbing segment 531 by an extension spring 551 and retained from going beyond the chamfer segment 532 so that the rack 50 is prevented from unintentionally falling downward. Consequently, it is ensured that the first and second forming rollers 30, 70 are posed vertically and the mold wheels 33, 73 contact each other.

Referring to FIGS. 6 and 7 for installation of the first film roll 23 and the second film roll 24. In FIG. 6, the pulleys 52 of the rack 50 pass along the climbing segment 531, the chamfer segment 532 and the declining segment 533. Meantime, the first forming roller 30 and the gear 36 thereof move along the gear 76 of the second forming roller 70, thereby causing the rack 50 and the first forming roller 30 overturn toward the output end 11 of the machine base 10. The pulleys 52 guided by the cam track of the rails 51 lift the first forming roller 30 and the gear 36 in the manner that part of teeth of the gears 36, 76 remain partially contacting so as to hold the relative position between the gears 36, 76 while a gap exists between the first forming roller 30 and the second forming roller 70 for allowing the plastic films 231, 241 to pass therethrough. Afterward, the blower 40 is lifted in the direction indicated by Arrow A and the second film roll 24 can be installed. Then the film 241 is drawn to pass through the gap between the first forming roller 30 and the second forming roller 70.

In FIG. 7, the blower 40 is placed back to the rear of the first forming roller 30 and the second forming roller 70. Then the first film roll 23 is installed with its film 231 passing through the gap between the first forming roller 30 and the second forming roller 70 to lie on the second film 241 of the second film roll 24. At last, the rack 50 and the first forming roller 30 are returned to the position as shown in FIG. 3 where the pulleys 52 are placed at the border between the chamfer segment 532 and the climbing segment 531.

For holding the blower 40 in either its lifted position or its horizontal operation position, pins 46, 47 are provided at the exterior of the blower 40 and the lateral walls of the machine base 10. Each pair of the pins 46, 47 are connected by a spring 48. Arched holes 12 are provided at the lateral walls of the machine base 10 for the pins 46 on the blower 40 to insert.

The present invention has been described with reference to the preferred embodiment and it is understood that the embodiment is not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. An air cushion maker, comprising:
   a machine base;
   two material-feeding rollers such assembled to the machine base that an altitudinal difference exists therebetween;
   two forming rollers each having a shaft and a mold wheel mounted around the shaft, wherein the mold wheel is externally provided with recesses having determined shape and depth, and an electrothermal wire passing between the recesses and extending to one end of the mold wheel, and wherein the forming rollers are aligned vertically while the mold wheels contact each other;
   a driving device for driving the forming rollers to rotate; and
   a blower settled in the machine base, between the first material-feeding roller and the second material-feeding roller, wherein the blower has an air outlet located adjacent to a border between the first forming roller and the second forming roller;
   in operation, two film rolls being installed onto the material-feeding rollers and each providing a consecutive plastic film passing between the two forming rollers, the driving device driving the forming rollers to rotate so as to draw the plastic films toward an output end of the machine base while the blower provides a pressured air current between the films before the films pass between the forming rollers so that the two consecutive plastic films after passing between the forming rollers are made into an air cushion with geometric puffy air cells.

2. The air cushion maker of claim 1, wherein the second forming roller has a shaft mounted near the output end of the machine base while the first forming roller has a shaft mounted on a rack, which is rotatably coupled with the shaft of the second forming roller.

3. The air cushion maker of claim 2, wherein rails and pulleys are provided flanking the rack and the machine base, each said pulley being installed in a said rail and the rails defining a cam track.

4. The air cushion maker of claim 3, wherein the cam track extends along top edges of lateral walls of the machine base and includes a climbing segment raising from top edges of lateral walls of the machine base, a chamfer segment following the up-going segment, and a declining segment following the chamfer segment.

5. The air cushion maker of claim 3, wherein when the pulleys move along the cam track, a gap exists between the forming rollers for allowing the plastic films to pass therethrough.

6. The air cushion maker of claim 1, wherein the blower is rotatably coupled with the machine base through a pivot assembly.

7. The air cushion maker of claim 6, wherein the pins are provided at an exterior of the blower and the lateral walls of the machine base, each pair of the pins being connected by a spring and arched holes being provided at the lateral walls of the machine base the pins on the blower to insert.

8. The air cushion maker of claim 7, wherein the shaft of each forming roller has a gear and the dears of the forming rollers are engaged with each other while the gear of one said forming roller is further engaged with a driving gear powered by the driving device so that rotation of the gears makes the shafts of the forming rollers to rotate.

* * * * *